United States Patent
Tazawa et al.

(10) Patent No.: US 9,786,881 B2
(45) Date of Patent: Oct. 10, 2017

(54) BATTERY PACK AND POWER SUPPLY UNIT

(71) Applicant: YAZAKI ENERGY SYSTEM CORPORATION, Tokyo (JP)

(72) Inventors: Kazutoshi Tazawa, Numazu (JP); Mariko Suzuki, Numazu (JP)

(73) Assignee: YAZAKI ENERGY SYSTEM CORPORATION, Tokyo (JP)

( * ) Notice: Subject to any disclaimer, the term of this patent is extended or adjusted under 35 U.S.C. 154(b) by 225 days.

(21) Appl. No.: 14/687,229

(22) Filed: Apr. 15, 2015

(65) Prior Publication Data

US 2015/0303421 A1    Oct. 22, 2015

(30) Foreign Application Priority Data

Apr. 16, 2014    (JP) .................. 2014-084550

(51) Int. Cl.
*H01M 2/10*    (2006.01)
(52) U.S. Cl.
CPC ...... *H01M 2/1077* (2013.01); *H01M 2220/10* (2013.01)
(58) Field of Classification Search
CPC .......... H01M 2220/10; H01M 2/1077; H01M 2/1016; H01M 2/1038; H01M 2/105; H01M 2/1061; H01M 2/1072
See application file for complete search history.

(56) References Cited

U.S. PATENT DOCUMENTS

| | | | | |
|---|---|---|---|---|
| 5,567,542 A | * | 10/1996 | Bae | H01M 2/1016 429/120 |
| 2002/0179552 A1 | * | 12/2002 | Marraffa | H01M 2/1077 211/49.1 |
| 2009/0274952 A1 | * | 11/2009 | Wood | B60L 11/1874 429/99 |
| 2010/0055556 A1 | * | 3/2010 | Meschter | H01M 2/1077 429/159 |
| 2012/0270095 A1 | * | 10/2012 | Kim | H01M 2/1077 429/159 |
| 2012/0293956 A1 | * | 11/2012 | Gu | H01M 2/1077 361/692 |

FOREIGN PATENT DOCUMENTS

JP    2008-243526 A    10/2008

\* cited by examiner

*Primary Examiner* — Carlos Barcena
(74) *Attorney, Agent, or Firm* — Sughrue Mion, PLLC

(57) ABSTRACT

A battery pack comprises a battery unit containing a plurality of batteries connected in series or in parallel; a lower frame housing a portion of a side of a bottom of the battery unit and mounted on an shelf plate top surface; a upper frame housing a portion on the side of a top surface of the battery unit as a surface opposed to the bottom and holding the battery unit by being connected to the lower frame; and a bracket mounted on the lower frame and fixed to the shelf plate top surface.

10 Claims, 4 Drawing Sheets

BATTERY PACK AND POWER SUPPLY UNIT

CROSS REFERENCE TO RELATED APPLICATIONS

This application claims the priority of Japanese Patent Application No. 2014-054550, filed on Apr. 16, 2014, the entire content of which are incorporated herein by reference.

BACKGROUND

Technical Field

The present invention relates to a battery pack and a power supply unit.

Related Art

A battery pack configured by a plurality of batteries connected in series or in parallel being integrally put together in a housing or the like has been known. JP 2008-243526 A discloses a configuration in which a plurality of sub-modules, which are formed by fixing group cells to a frame body and connecting the group cells electrically, is housed in a hexahedral armored case and electrically connected.

SUMMARY

In a conventional battery pack, however, there is room for improvement in resistance against vibration to maintain strength against vibration such as an earthquake when fixed to a predetermined position of, for example, a rack.

The present invention is made in view of the above circumstances and an object thereof is to provide a battery pack capable of improving resistance against vibration and a power supply unit.

To solve the above-mentioned problems, one aspect of the invention provides a battery pack comprising: a battery unit containing a plurality of batteries connected in series or in parallel; a first frame housing a portion of a side of a bottom of the battery unit and mounted on an installation surface; a second frame housing a portion on the side of a top surface of the battery unit as a surface opposed to the bottom and holding the battery unit by being connected to the first frame; and a support member mounted on the first frame and fixed to the installation surface.

Furthermore, in the above aspect of the invention may provide the battery pack, wherein the support member has an abutting surface in surface contact with the installation surface when fixed to the installation surface.

Furthermore, in the above aspect of the invention may provide the battery pack, wherein a honeycomb structure is formed at the bottom of the first frame abutting on the installation surface.

Another aspect of the invention provides a power supply unit comprising: a plurality of the aforementioned battery packs; a base portion including an installation surface on which the plurality of battery packs is arranged; a battery-side fitting portion provided on a bottom of a first frame abutting on the installation surface in the plurality of battery packs; and an installation surface side fitting portion provided on the installation surface so as to be fitted into the battery-side fitting portion when the first frame is mounted in a predetermined position on the installation surface.

Furthermore, in the above aspect of the invention may provide the power supply unit, wherein the battery-side fitting portion is a cell of a honeycomb structure formed at the bottom of the first frame, and the installation surface side fitting portion is a projection formed so as to be fitted into the cell while in contact with a partition wall of the cell when the first frame is mounted in the predetermined position on the installation surface.

According to the present invention, a frame holding and housing a plurality of batteries is fixed to an installation surface and therefore, an effect of being able to improve resistance to vibration of a battery pack can be achieved.

DETAILED DESCRIPTION

Figure 1:
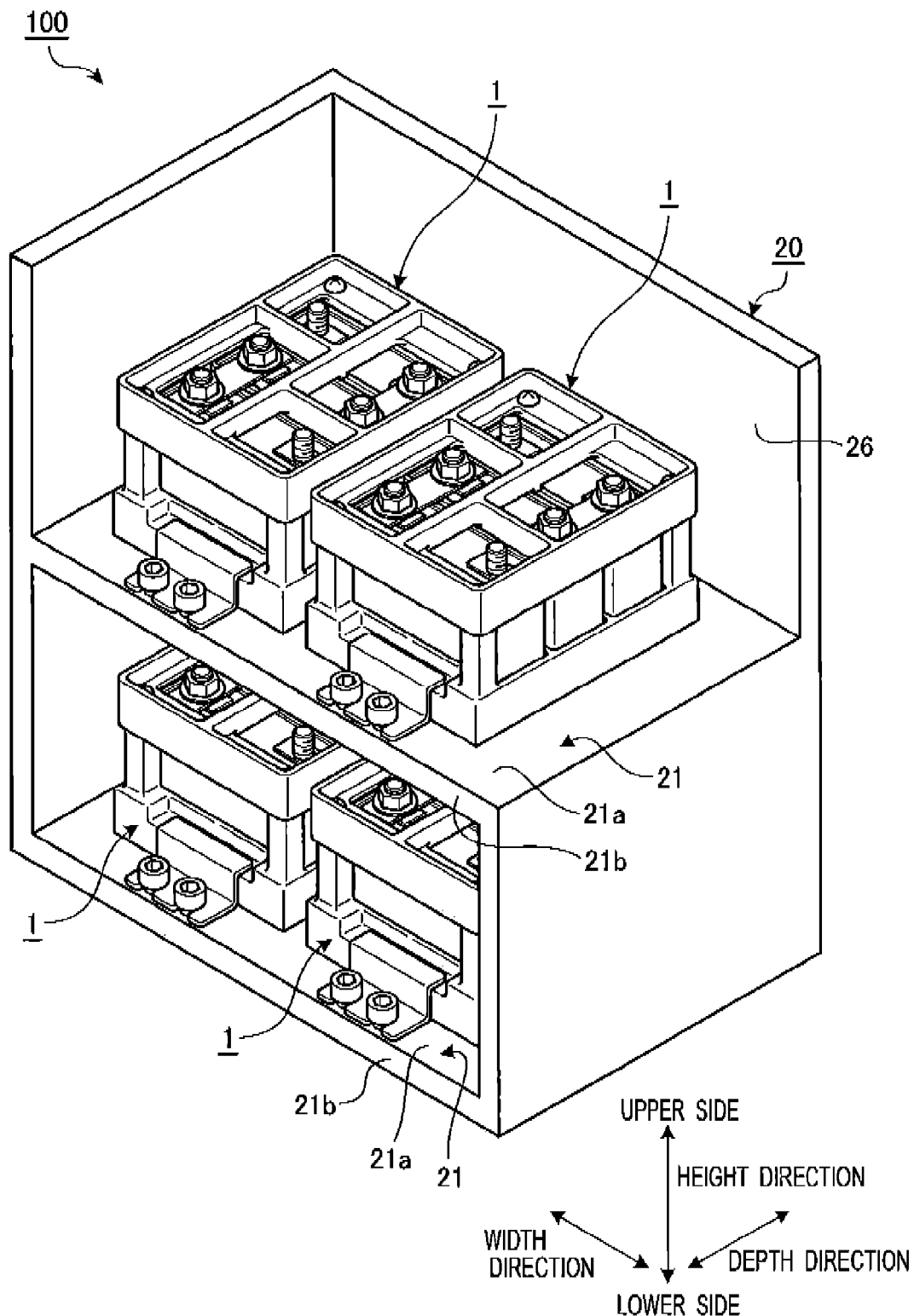
FIG. 1 is a perspective view showing an outline configuration of a battery pack according to an embodiment of the present invention and a power supply unit including a plurality of the battery packs.

Hereinafter, a battery pack according to an embodiment of the present invention and a power supply unit including a plurality of the battery packs will be described based on the drawings. In the drawings shown below, the same reference signs are attached to the same or similar portions and the description thereof is not repeated.

[Embodiment ]

First, the configuration of a battery pack 1 according to an embodiment of the present invention and a power supply unit 100 including a plurality of the battery packs 1 will be described with reference to FIGS. 1 to 4.

The battery pack 1 is typically configured by integrally putting together a battery unit 10 formed from a plurality of batteries 10a to 10c connected in series or in parallel in a housing or the like. The power supply unit 100 is configured by electrically connecting a plurality of the battery packs 1. The power supply unit 100 outputs a required capacity or voltage by, for example, as shown in FIG. 1, installing the plurality of battery packs 1 in a rack 20 and electrically connecting the plurality of battery packs 1. The power supply unit 100 is mainly used as a stationary storage battery (ESS: Energy Storage System) for exchanges and hospital emergency use, for example.

Figure 2:
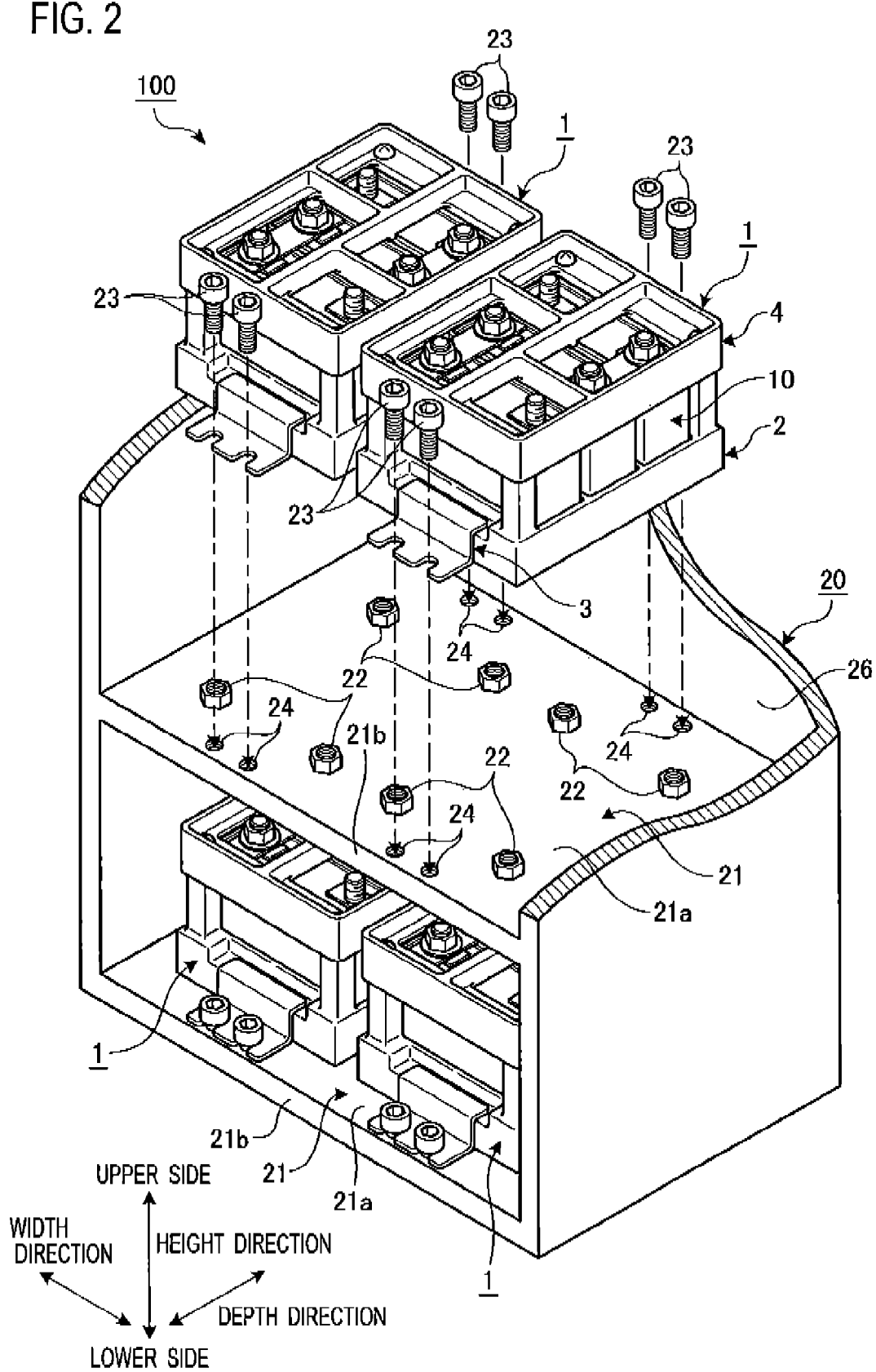
FIG. 2 is an exploded perspective view showing details of an installation structure of the battery pack in the power supply unit shown in FIG. 1.

In the description that follows, while the battery packs 1 are installed in the rack 20 as shown in FIGS. 1 and 2, the direction from a shelf plate end face 21b on the opening side of the rack 20 to a back plate 26 is defined as a "depth direction", an extending direction of the shelf plate end face 21b perpendicular to the depth direction is defined as a "width direction", and a normal direction of a shelf plate top surface 21a as an installation surface of the battery pack 1 is defined as a "height direction". In the height direction, the side of the shelf plate top surface 21a relative to the battery unit 10 is defined as a lower side and the side of an upper frame 4 is defined as an upper side.

The battery pack 1 is fixed by, as shown in FIGS. 1 and 2, screwing four fastening bolts 23 for each of the battery packs 1 into fastening holes 24 in the shelf plate top surface 21a (installation surface) of a shelf plate 21 (base portion) of the rack 20. Also, as shown in FIG. 2, the shelf plate top surface 21a has four nuts 22 (installation surface side fitting portions) fixed thereto in individual installation positions of the battery pack 1. On the other hand, the battery pack 1 is provided with a honeycomb structure in which a plurality of cells 2d is partitioned by a partition wall 2e as columnar units at the bottom (a bottom 2c of a lower frame 2 described later). The shape of each of the cells 2d of the honeycomb structure is the same shape as that of the nut 22 and the nut 22 can be fitted thereinto. Each of the nuts 22 on the shelf plate top surface 21a is provided so as to be fitted into any one of the cells 2d in a state of being in contact with the partition wall 2e of the honeycomb structure when the battery pack 1 is placed in a predetermined position of the shelf plate top surface 21a. That is, out of the cells 2d of the honeycomb structure the cell 2d fitted into the nut 22 functions as a battery-side fitting portion. Therefore, the power supply unit 100 according to the present embodiment includes the plurality of battery packs 1, a plurality of the shelf plates 21 as a base portion to arrange the plurality of battery packs 1, the nut 22 as an installation surface side fitting portion, and the cell 2d of the honeycomb structure as a battery-side fitting portion as an installation structure of the battery pack 1.

Figure 3:
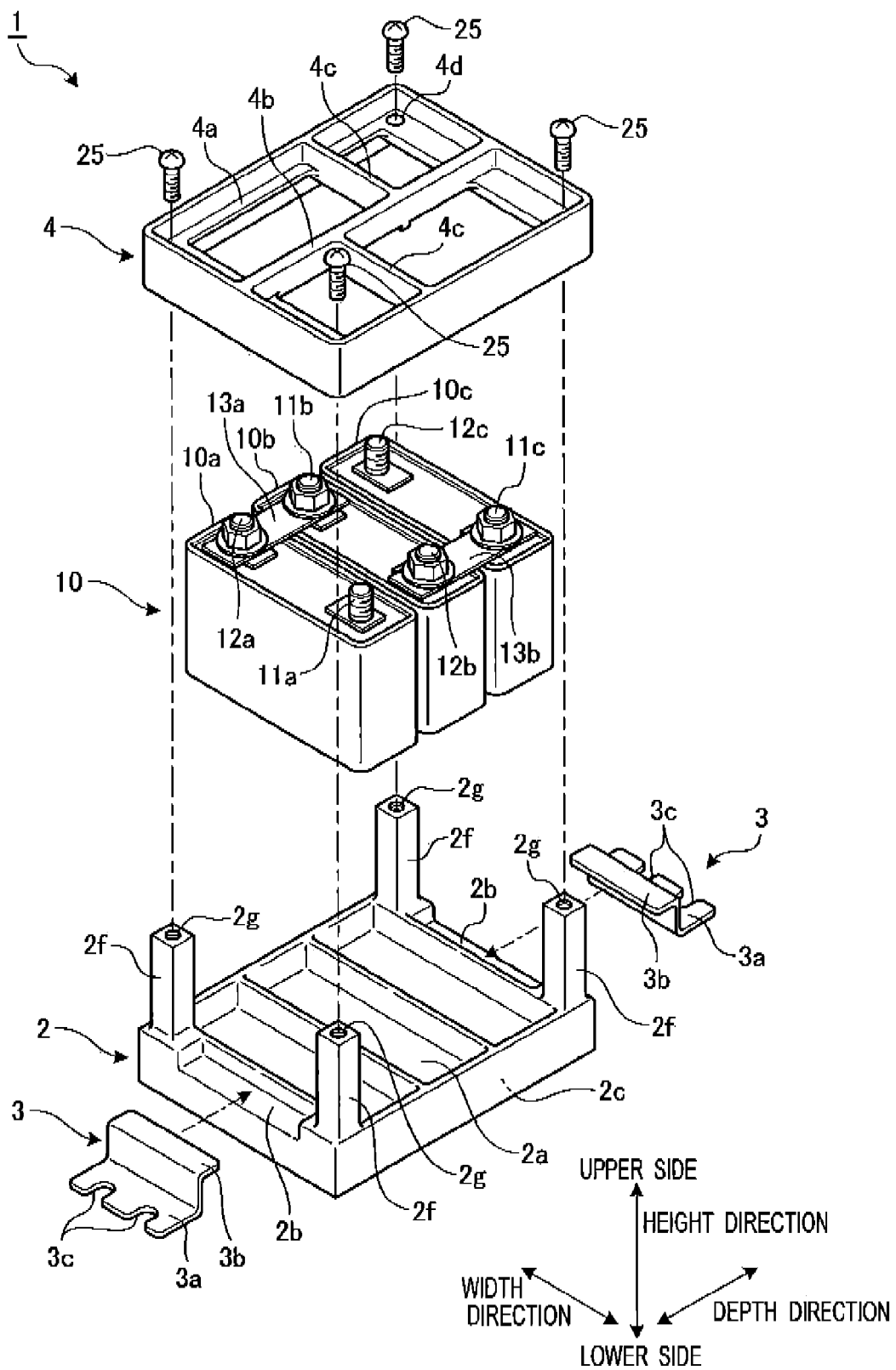
FIG. 3 is an exploded perspective view of the battery pack in FIGS. 1 and 2.

The battery pack 1 includes, as shown in FIG. 3, the battery unit 10, the lower frame 2 (first frame), a bracket 3 (support member), and the upper frame 4 (second frame). The lower frame 2 and the upper frame 4 are formed from for example, a resin material. The bracket 3 is formed from, for example, a metallic material.

Each of the plurality of batteries 10a to 10c constituting the battery unit 10 has a substantially rectangular parallelepiped shape and has positive electrode terminals 11a to 11c and negative electrode terminals 12a to 12c provided side by side along the width direction on the top surface on the upper side in the height direction. The plurality of batteries 10a to 10c is arranged in a row along the depth direction and is connected in series to neighboring batteries via bus bars 13a, 13b. In the example shown in FIG. 3, the battery 10b arranged in the center is arranged such that the positions of the positive electrode terminal and the negative electrode terminal are reversed from those of the other batteries 10a, 10c arranged on both sides. The negative electrode terminal 12a of the battery 10a is electrically connected to the positive electrode terminal 11b of the battery 10b by the bus bar 13a and the negative electrode terminal 12b of the battery 10b is electrically connected to the positive electrode terminal 11c of the battery 10c by the bus bar 13b. Incidentally, the connection configuration of the plurality of batteries 10a to 10c may be other than the connection example shown in FIG. 3. Each of the plurality of batteries 10a to 10c contains, for example, a nickel metal hydride secondary battery, a lithium secondary battery.

Figure 4:
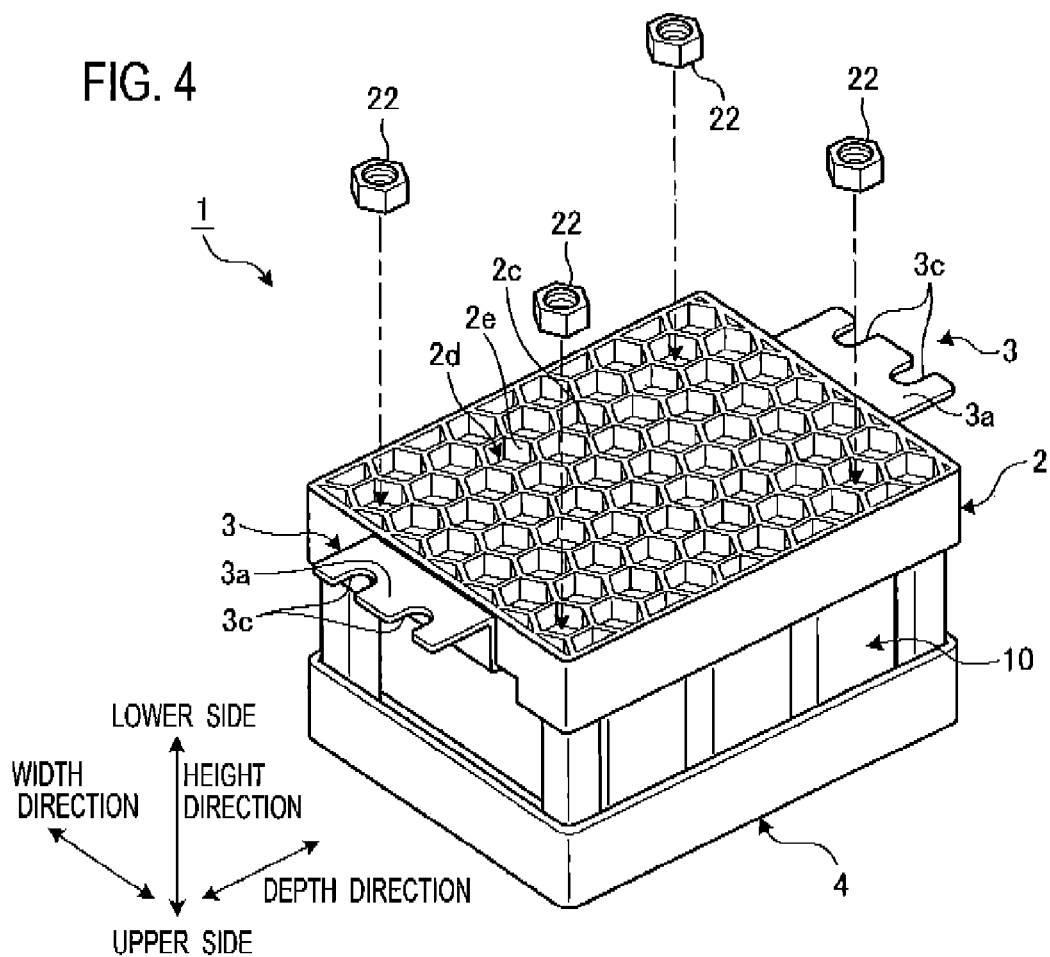
FIG. 4 is a perspective view when the battery pack is viewed from lower side.

The lower frame 2 supports the battery unit 10 from below. The lower frame 2 is a flat-plate member having a thickness in the height direction and has a rectangular shape larger than that of the battery unit 10 when viewed from the height direction. A battery housing groove 2a to house a portion of the individual batteries 10a to 10c on the bottom side of the battery unit 10 is provided on the upper surface of the lower frame 2. A connection portion 2b to mount the bracket 3 is provided on a pair of side faces opposed to each other in the depth direction. Also, as described above, a honeycomb structure is formed, as shown in FIG. 4, over the entire surface of the bottom 2c abutting on the shelf plate top surface 21a of the rack 20 when installed. Further, a columnar portion 2f extending along the upper side in the height direction is provided at each corner of the rectangular shape when viewed from the height direction.

The bracket 3 fixes the battery pack 1 to the shelf plate top surface 21a by being mounted on the lower frame 2 and fixed to the shelf plate top surface 21a by the fastening bolt 23. The bracket 3 has an abutting surface 3a in surface contact with the shelf plate top surface 21a when fixed to the shelf plate top surface 21a and a mounting portion 3b to mount on the connection portion 2b of the lower frame 2. The abutting surface 3a is provided with a cutout portion 3c to allow the fastening bolt 23 to pass through. The mounting portion 3b has, for example, an edge bent downward and can engage the bracket 3 with the lower frame 2 by engaging the edge with an engagement groove provided in the connection portion 2b of the lower frame 2. Incidentally, the connection structure of the mounting portion 3b and the connection portion 2b of the lower frame 2 may be a known one.

The upper frame 4 supports the battery unit 10 from above. The upper frame 4 is a frame-shaped resin member having a thickness in the height direction and has a rectangular shape larger than that of the battery unit 10 when viewed from the height direction. A peripheral edge portion 4a protrudes to the horizontal inner side from the entire circumferential inner surface of the upper frame 4. Also, link portions 4b, 4c are connected between opposite sides opposed to each other in the depth direction. Also a through hole 4d is provided at each corner of the rectangular shape when viewed from the height direction and the upper frame 4 can integrally be connected to the lower frame 2 by inserting a mounting screw 25 into the through hole 4d and screwing the mounting screw 25 into a screw hole 2g provided in an upper end surface of the columnar portion 2f of the lower frame 2. By connecting the upper frame 4 and the lower frame 2 while the battery unit 10 is housed, a state in which the battery unit 10 is held between the upper frame 4 and the lower frame 2 can be created.

Next, the operation/working-effect of the battery pack 1 according to an embodiment of the present embodiment and the power supply unit 100 will be described.

The battery pack 1 includes the battery unit 10 containing the plurality of batteries 10a to 10c connected in series or in parallel, the lower frame 2 housing a portion on the bottom side of the battery unit 10 and mounted on the shelf plate top surface 21a, the upper frame 4 housing a portion on the top surface side of the battery unit 10 as the surface opposed to the bottom and holding the battery unit 10 by being connected to the lower frame 2, and the bracket 3 fixed to the shelf plate top surface 21a by being mounted on the lower frame 2.

With the above configuration, the battery unit 10 is held between the upper frame 4 and the lower frame 2 in the height direction from both of the upper side and the lower side and is further fixed to the shelf plate top surface 21a via the bracket 3 and therefore, the battery unit 10 can be installed in a very stable state. Accordingly, the strength can suitably be maintained against vibration such as an earthquake and thus, the resistance against vibration of the battery pack 1 can be improved. In addition, by pressing the battery unit 10 from an upper and lower direction by the upper frame 4 and the lower frame 2, each of the batteries 10a to 10c of the battery unit 10 can be inhibited from flying out of the battery pack 1 during longitudinal vibration of an earthquake or the like.

Also in the battery pack 1 according to the present embodiment, the bracket 3 has the abutting surface 3a in surface contact with the shelf plate top surface 21a when fixed to the shelf plate top surface 21a. With this configuration, the bracket 3 can be brought into surface contact with the shelf plate top surface 21a and the contact area between the battery pack 1 and the shelf plate top surface 21a can be increased and therefore, the concentration of stress on the battery pack 1 during longitudinal vibration of an earthquake or the like can be suppressed. Further, the contact area between the battery pack 1 and the shelf plate top surface 21a can be adjusted by changing the area of the abutting surface 3a and so the concentration of stress can be adjusted.

Also in the battery pack 1 according to the present embodiment, the honeycomb structure is formed at the bottom 2c of the lower frame 2 abutting on the shelf plate top surface 21a. With this configuration, the strength of the lower frame 2 can be increased against the self-weight of the battery unit 10 and even if the lower frame 2 is formed from a relatively light material such as plastics other than metal, the strength thereof can be secured.

The power supply unit 100 according to the present embodiment includes the plurality of battery packs 1, the plurality of shelf plates 21 including the shelf plate top surface 21a on which the plurality of shelf plates 21 is arranged, the cell 2d of the honeycomb structure as the battery-side fitting portion provided on the bottom 2c of the lower frame 2 abutting on the shelf plate top surface 21a of the rack 20 in the plurality of battery packs 1, and the nut 22 as the installation surface side fitting portion provided on the shelf plate top surface 21a so as to fit into the cell 2d while in contact with the partition wall 2e of the cell 2d of the honeycomb structure when the lower frame 2 is mounted in a predetermined position on the shelf plate top surface 21a.

With the above configuration, when the battery pack 1 is mounted in a predetermined position on the shelf plate top surface 21a, the nut 22 on the shelf plate top surface 21a is fitted into the cell 2d while in contact with the partition wall 2e of the cell 2d of the honeycomb structure at the bottom 2c of the lower frame 2 and therefore, the battery pack 1 is fixed not only in the vertical direction (height direction), but also in the horizontal direction (width direction, depth direction) by the bracket 3 and the fastening bolt 23. Accordingly, the concentration of stress can be suppressed not only on the battery pack 1 during longitudinal vibration of an earthquake or the like, but also on the battery pack 1 during transverse vibration of an earthquake or the like. Further, if the number of the nuts 22 fitted into the cells 2d is increased from four illustrated in the embodiment, a wider contact area during rolling can be secured so that the stress can be dispersed still more and breaking of the frame due to the concentration of stress can be prevented. In addition, by providing the nuts 22 on the shelf plate top surface 21a, positioning when the battery pack 1 is mounted in a predetermined position on the shelf plate top surface 21a can be determined easily.

Here, the effect of fitting the honeycomb structure of the lower frame 2 of the battery pack 1 and the nut 22 on the shelf plate top surface 21a when the battery packs 1 are arranged on the shelf plate in the power supply unit 100 according to the present embodiment will be described in more detail with reference to FIG. 5 and Tables 1 and 2 below.

Figure 5:
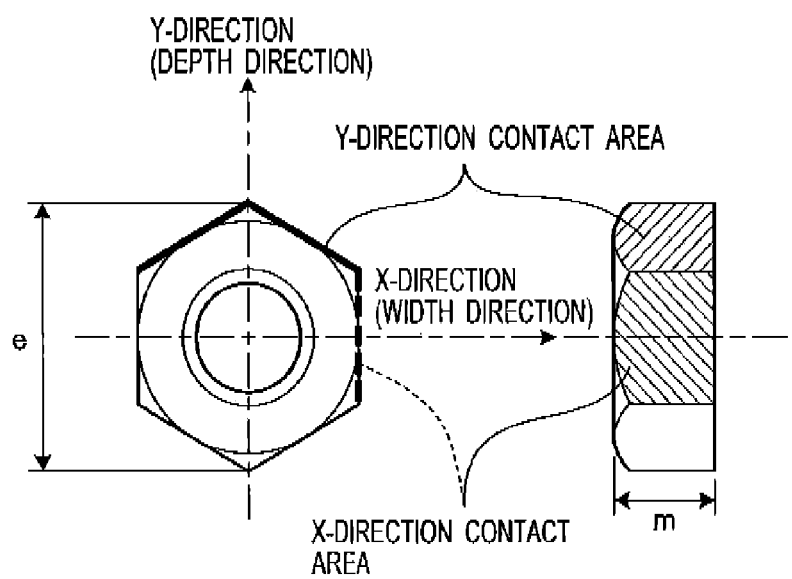
FIG. 5 is a schematic view showing various parameters of a nut fitted into a honeycomb structure of a lower frame and a contact area during horizontal vibration.

FIG. 5 is a schematic view showing various parameters of the nut fitted into the honeycomb structure of the lower frame and the contact area during horizontal vibration. Table 1 is a table showing various parameters by nut size (M3, M4, M5). "X direction" and "Y direction" in Table 1 are, as shown in FIG. 5, the width direction and the depth direction in FIGS. 1 to 4 respectively. Parameters m, e in Table 1 are, as shown in FIG. 5, the height [mm] and the width across corners [mm] of the nut 22. In Table 1, a side length [mm] as the length of one side of the nuts 22 in a hexagonal shape, an X-direction contact area [mm$^2$] as an area of a portion (one side of the hexagonal shape indicated by a solid dotted line in FIG. 5) mainly in contact with the partition wall 2e of the honeycomb structure of the peripheral surface of the nut 22 when subjected to vibration in the X direction, and a Y-direction contact area [mm$^2$] as an area of a portion (two sides of the hexagonal shape indicated by a solid line in FIG. 5) mainly in contact with the partition wall 2e of the honeycomb structure of the peripheral surface of the nut 22 when subjected to vibration in the Y direction are also shown.

TABLE 1 various parameters by nut size

| | Various parameters | | | | |
|---|---|---|---|---|---|
| Nut size | m [mm] | e [mm] | Side length [mm] | X-direction contact area [mm$^2$] | Y-direction contact area [mm$^2$] |
| M3 | 2.4 | 6.4 | 3.2 | 82 | 164 |
| M4 | 3.2 | 8.1 | 4.05 | 131 | 262 |
| M5 | 4 | 9.2 | 4.6 | 169 | 339 |

The configuration in which the four nuts 22 of the dimensions shown in Table 1 are fitted into the honeycomb structure (that is, the same configuration as the present embodiment) will be denoted as an "embodiment" below. On the other hand, the configuration in which the battery pack 1 is fixed to the shelf plate top surface 21a only by the fastening bolt 23 without providing the nut 22 fitted into the honeycomb structure on the shelf plate top surface 21a will be denoted as a "comparative example" below. Table 2 shows a result of comparing stresses to which the battery pack 1 is subjected when the embodiment and the comparative example are subjected to vibration registering 7 on the Japanese seismic scale. In general, when subjected to vibration registering 7 on the Japanese seismic scale, an object is subjected to an acceleration of 9.3 G or more. If the weight of the battery pack 1 is 5 kg, a force acting on a connection portion between the battery pack 1 and the shelf plate top surface 21a is 5 kg ×9.8 m/s$^2$×9.3 G=455 kg=4550 N. Table 2 is a table showing rough stresses of the comparative example and the embodiment under the above condition. As shown in Table 2, the force acting on each of the four fastening bolts 23 is 1138 N in the comparative example. In the embodiment, by contrast, the four nuts 22 are in surface contact with the partition wall 2e of the honeycomb structure and thus, as shown in Table 2, the stress acting on the battery pack 1 is reduced to about 1/20 to 1/42 for vibration in the X direction and to about 1/40 to 1/84 for vibration in the Y direction when compared with the comparative example.

TABLE 2

| | rough stresses of comparative example and embodiment | | | | |
|---|---|---|---|---|---|
| | Comparative example (not fitted into honeycomb structure) | Embodiment (fitted into honeycomb structure) | | | |
| Nut | Force acting on fastening bolt | X direction force | Y direction force | Reduced stress ratio | |
| size | [N/bolt] | [N/mm$^2$] | [N/mm$^2$] | X direction | Y direction |
| M3 | 1138 | 56 | 28 | About 1/20 | About 1/40 |
| M4 | 1138 | 35 | 17 | About 1/32 | About 1/64 |
| M5 | 1138 | 27 | 13 | About 1/42 | About 1/84 |

Therefore, it is evident that in the power supply unit 100 according to the present embodiment, the concentration of stress on the battery pack 1 during vibration (particularly, transverse vibration) of an earthquake or the like can be suppressed by fitting the honeycomb structure of the lower frame 2 of the battery pack 1 and the nut 22 on the shelf plate top surface 21a.

In the foregoing, an embodiment of the present invention has been described, but the embodiment is presented by way of example and limiting the scope of the invention is not intended. The embodiment can be carried out in various other forms and various omissions, substitutions, and alterations can be made without deviating from the spirit of the invention. The embodiment and modifications thereof are included in the scope and spirit of the invention and also included in the scope of inventions described in claims and equivalents thereof.

In the embodiment, the configuration in which the nut 22 is fixed to the shelf plate top surface 21a is illustrated as an installation surface side fitting portion fitted into the cell 2d of the honeycomb structure, but only fittability into the cell 2d of the honeycomb structure is needed and the nut 22 may be replaced by a projection.

In the embodiment, the configuration in which the nut 22 in a convex shape is provided as an installation surface side fitting portion and a cell in a concave shape is provided as a battery-side fitting portion is illustrated, but conversely, a configuration in which a concave shape is provided on the installation surface side and a convex shape protruding from the bottom is provided on the battery pack side may also be adopted.

What is claimed is:

1. A battery pack comprising:
a battery unit containing a plurality of batteries connected in series or in parallel;
a first frame housing a portion of a side of a bottom of the battery unit and mounted on an installation surface; and
a second frame housing a portion on the side of a top surface of the battery unit as a surface opposed to the bottom and holding the battery unit by being connected to the first frame,
wherein the first frame comprises at least one battery housing groove formed in a top surface of the first frame for housing at least one battery of the plurality of batteries,
wherein the first frame further comprises at least one cell formed in a bottom surface of the first frame directly beneath the at least one battery housing groove, and
wherein the installation surface comprises at least one fitting portion projecting from the installation surface toward the first frame, the at least one cell of the first frame receiving the at least one fitting portion to fix the first frame relative to the installation surface.

2. The battery pack according to claim 1, wherein the at least one cell comprises a plurality of cells formed as a honeycomb structure in the bottom of the first frame.

3. The battery pack according to claim 1, further comprising a support member mounted on the first frame and fixed to the installation surface.

4. The battery pack according to claim 3, wherein the support member has an abutting surface in surface contact with the installation surface when fixed to the installation surface.

5. The battery pack according to claim 1, wherein the at least one cell is partitioned from the at least one battery housing groove.

6. The battery pack according to claim 1, wherein:
the at least one cell comprises a plurality of cells formed in the bottom surface of the first frame, and
the at least one fitting portion comprises a plurality of fitting portions projecting from the installation surface toward the first frame.

7. The battery pack according to claim 1, wherein the at least one cell and the at least one fitting portion have matching cross-sectional shapes taken in cross-section parallel to the installation surface.

8. The battery pack according to claim 7, wherein the matching cross-sectional shape is a hexagon.

9. A power supply unit comprising:
a plurality of the battery packs according to claim 1;
a base portion including the installation surface on which the plurality of battery packs is mounted;
wherein the at least one fitting portion comprises a plurality of fitting portions.

10. A power supply unit comprising a plurality of the battery packs according to claim 1, wherein
at least one fitting portion is a formed so as to be fitted into the at least one cell while in contact with a partition wall of the at least one cell when the first frame is mounted on the installation surface.

* * * * *